United States Patent [19]

Leach

[11] 4,078,042

[45] Mar. 7, 1978

[54] PROCESS FOR PREPARING ZEOLITE A

[75] Inventor: Bruce E. Leach, Ponca City, Okla.

[73] Assignee: Continental Oil Company, Ponca City, Okla.

[21] Appl. No.: 789,389

[22] Filed: Apr. 21, 1977

[51] Int. Cl.$^2$ ............................................. C01B 33/28
[52] U.S. Cl. ................................................... 423/329
[58] Field of Search ............... 423/329, 330, 328, 118; 252/455 Z

[56] References Cited

U.S. PATENT DOCUMENTS

| | | | |
|---|---|---|---|
| 2,882,243 | 4/1959 | Milton | 423/328 |
| 3,058,805 | 10/1962 | Weber | 423/328 |
| 3,114,603 | 12/1963 | Howell | 423/118 |
| 3,535,075 | 10/1970 | Ueda et al. | 423/329 |

*Primary Examiner*—Edward J. Meros
*Attorney, Agent, or Firm*—Bayless E. Rutherford, Jr.

[57] ABSTRACT

A process for preparing sodium Zeolite A is disclosed. The process comprises:
  (a) treating an aluminum alkoxide with water in the presence of a reactive silica compound to form an amorphous sodium aluminum silicate gel in the admixture,
  (b) heating the admixture-containing gel of step (a) at a predetermined temperature (e.g. 70° to 120° C.) until substantially all of the product is Zeolite A, and
  (c) recovering the desired product.

15 Claims, No Drawings

PROCESS FOR PREPARING ZEOLITE A

FIELD OF THE INVENTION

The invention is in the general field of preparing sodium Zeolite A.

GENERAL BACKGROUND

Sodium Zeolite A is represented by the formula $(NaAl\ SiO_4)_{12} \cdot 27H_2O$. It has a specific crystalline structure which has been published in numerous references, e.g. U.S. Pat. No. 3,535,075 (issued Oct. 20, 1970). In addition the structure of sodium Zeolite A is described in the book "Molecular Sieve Zeolites - I" - Advances in Chemistry Series, published by the American Chemical Society, Washington, D.C. (1971). FIG. 25 on page 166 of this book provides a pictorial view of the crystal structure of sodium Zeolite A.

Sodium Zeolite A is very useful as a cation exchange resin for calcium and magnesium compounds. This is due to its unusual physical properties.

Many processes are known for preparing sodium Zeolite A. One such process uses kaolin as the alumina source. The kaolin is first calcined and then added to a sodium ion source such as sodium hydroxide or sodium silicate. A silica source (e.g. sodium silicate, water glass, or silica sol) is then added to make the corrent Na:Al:SiO$_2$ ratio for Zeolite A. This mixture is then heated at 80° to 120° C. for extended periods of time until sodium Zeolite A crystallizes from solution. A disadvantage of this process is that the balance of the clay remains and presents a disposal problem.

My invention provides a novel and improved process for preparing sodium Zeolite A.

PRIOR ART

While several processes are known for preparing sodium Zeolite A, a search of the prior art did not produce any references which use aluminum alkoxides to prepare the material.

BRIEF SUMMARY OF THE INVENTION

Briefly stated, the present invention is directed to a process for preparing sodium Zeolite A, wherein the process comprises:

(a) forming an admixture of water, reactive silica compound and aluminum alkoxide, whereby an amorphous sodium aluminum silicate gel results, (b) heating the admixture-containing gel of step (a) at a predetermined temperature until substantially all of it is converted to sodium Zeolite A, and (c) recovering the sodium Zeolite A.

In one embodiment, the invention is directed to a continuous process of preparing sodium Zeolite A using an aluminum alkoxide containing predominantly 4 to 20 carbon atoms. This embodiment can be described as follows:

A continuous process for preparing sodium Zeolite A, wherein the process comprises:

(a) adding an admixture of (i) water containing reactive silica compound and (ii) $C_4$–$C_{20}$ aluminum alkoxide continuously to a reaction vessel, (b) agitating the contents of the reaction vessel whereby an upper alcohol phase and a lower aqueous phase containing amorphous sodium aluminum silicate is formed, (c) removing the alcohols of said alcohol phase overhead, (d) heating the aqueous phase at a temperature in the range of about 70 to about 120° C. until substantially all of the amorphous sodium aluminum silicate therein is converted to sodium Zeolite A, and (e) recovering the sodium Zeolite A.

DETAILED DESCRIPTION

Suitable aluminum alkoxides are represented by the formula $Al(OR)_3$ wherein the alkyl group contains from 1 to 20 carbon atoms and can be either straight or branched chain. A particularly suitable source for the aluminum alkoxides are intermediates in the preparation of linear alcohols (e.g. "Alfol" alcohols) by the well-known Ziegler process. These aluminum alkoxides are mixtures wherein the alkyl groups are linear, containing predominantly from 4 to 20 carbon atoms, with the $C_{10}$ or $C_{12}$ being the average alkyl group, and only minor, or immaterial amounts of $C_2$ and $C_{20+}$ groups.

Suitable "reactive silicas" are water soluble and are sodium salts of silicic acids containing at least an average of one sodium atom per silicon atom. Examples of suitable reactive silicas include the following: sodium metasilicate ($NaSiO_3$ and $Na_2SiO_3 \cdot 9H_2O$); sodium orthosilicate ($Na_4SiO_4$); and sodium silicate ($Na_2O \cdot xSiO_2$, wherein $x = 3$ to 5).

The amounts of materials which are used are shown in the following table, expressed as moles per mole of aluminum alkoxide.

|  | Silica* | Water |
|---|---|---|
| Suitable | 0.7–10 | 3–100 |
| Preferred | 0.9–2.0 | 30–60 |

*expressed as SiO$_2$

In conducting the process, the water, reactive silica compound and aluminum alkoxide are added to a suitable reaction vessel. Faster reaction is obtained by first adding the water, followed by the reactive silica compound and then by the aluminum alkoxide. The water can be at room temperature or it can be at the temperature maintained in the next step (i.e. 70° to 120° C.). Upon addition of the aluminum alkoxide an amorphous sodium aluminum silicate gel forms in the admixture. The amorphous sodium aluminum silicate gel is converted to sodium Zeolite A by maintaining the temperature of the reaction admixture at a temperature in the range of about 70° to about 120° C. for a sufficient period of time. Preferably, the temperature is in the range of about 80° to about 95° C. It is understood that use of a temperature above the boiling point of water requires application of a mild pressure to keep the system in a liquid state.

The heating is maintained for a sufficient period of time until substantially all of the product is Zeolite A. (Determination of Zeolite A is made by X-ray diffraction on a sample taken for analysis.) Longer heating times (e.g. 48 hours) result in a substantial amount of Zeolite P in the product. Typically, the heating time is in the range of about 5 to about 24 hours. Preferably, the heating time is in the range of about 7 to about 14 hours. More preferably, the heating time is in the range of about 9 to about 12 hours.

Upon termination of the heating the desired sodium Zeolite A is recovered from excess water and residual alcohol by conventional means such as filtration, centrifugation, etc. If desired the product may be washed with water to remove traces of impurities such as excess sodium silicate.

The admixture can be aged (i.e. maintained at 70° to 120° C. for a period of time) with the alcohols (which are a reaction by-product) either present or absent. In the case of the lower alcohols (i.e. $C_1$–$C_3$) most of them are removed by the heating step. When there is present a substantial amount of $C_4$–$C_{20}$ alcohols, it may be desirable to remove them from the admixture. These higher alcohols can be removed prior to the heating step by the following procedure. Most of the higher alcohols will form a separate phase which can be removed by decantation. Higher alcohols in the aqueous phase can be removed by extraction with butanol. Any butanol remaining in the aqueous phase can be removed by steam stripping. The aqueous phase, which contains the sodium aluminum silicate gel, is then heated.

The preceding description is applicable to either a batch or continuous process.

In commercial operation, more suitably the process is conducted on a continuous basis. When the alkoxy groups of the aluminum alkoxide contain a majority of 4 to 20 carbon atoms the process preferably includes the step of removing these alcohols prior to the heating step.

In order to illustrate the nature of the present invention still more clearly the following examples will be given. It is to be understood, however, that the invention is not to be limited to the specific conditions or details set forth in these examples except insofar as such limitations are specified in the appended claims.

The aluminum alkoxide used in the examples was an intermediate from the preparation of linear alcohols by the Ziegler process. The alkoxides were a mixture wherein the alkoxy groups contained from 4 to 20 carbon atoms, with $C_{10}$ or $C_{12}$ being the predominant alkoxy group.

Typically, the carbon content ($C_n$) of the alkyl groups in the aluminum alkoxide was as follows:

| $C_n$ | Wt. Percent | $C_n$ | Wt. Percent |
|---|---|---|---|
| $C_2$ | 0.4 | $C_{12}$ | 18.6 |
| $C_4$ | 2.8 | $C_{14}$ | 15.0 |
| $C_6$ | 8.2 | $C_{16}$ | 10.2 |
| $C_8$ | 14.7 | $C_{18}$ | 5.9 |
| $C_{10}$ | 18.8 | $C_{20}$ | 3.1 |

EXAMPLE 1

28.4 grams (0.1 mole) of sodium metasilicate ($Na_2SiO_3 \cdot 9H_2O$) was dissolved in 100 grams of water and heated to 90° C. in a reaction vessel. 40 grams (0.1) mole of aluminum alkoxide was added. A sodium aluminum silicate gel precipitated immediately. An alcohol phase and an aqueous phase formed. Substantially all of the alcohol phase was removed by decantation. X-ray analysis of a sample taken soon after formation of the gel indicated it to be amorphous. The remaining aqueous phase in the reaction vessel was refluxed at 95° C. for 24 hours. X-ray diffraction analysis of the product indicated it to be sodium Zeolite A with a trace of Zeolite P.

EXAMPLE 2

Example 1 was repeated with the exception that the contents of the reaction vessel were heated at 95° C. for 48 hours. X-ray diffraction analysis of the product indicated that the amount of Zeolite P had increased.

EXAMPLE 3

Example 1 was repeated with the exception that the amount of all materials was doubled and the heating time was 12 hours. Samples of the product were taken at 3, 5 and 7.5 hours. In addition a sample was taken of the final product. The samples were filtered, dried and analyzed by X-ray diffraction. The results of analysis of the various samples are shown below.

| Time (hrs.) | X-Ray Analysis |
|---|---|
| 3 | amorphous |
| 5 | amorphous + trace Zeolite A |
| 7.5 | Zeolite A + amorphous (about 5%) |
| 12 | Zeolite A + trace Zeolite P |

Thus, having described the invention in detail, it will be understood by those skilled in the art that certain variations and modifications may be made without departing from the spirit and scope of the invention as defined herein and in the appended claims.

I claim:

1. A process for preparing sodium Zeolite A, wherein the process comprises:
   (a) forming an admixture of
      (i) aluminum alkoxide wherein the alkoxy groups contain from 1 to about 20 carbon atoms,
      (ii) reactive silica compound which is present in an amount in the range of about 0.7 to about 10 moles, as $SiO_2$, per mole of aluminum alkoxide,
      (iii) from about 3 to about 100 moles of water per mole of aluminum alkoxide, said admixture forming an amorphous sodium aluminum silicate gel,
   (b) heating the admixture-containing gel of step (a) at a temperature in the range of about 70° to about 120° C. until substantially all of it is converted to sodium Zeolite A, and
   (c) recovering the sodium Zeolite A, said process being characterized further in that said reactive silica compound is water soluble and is one or more sodium salts of silicic acids containing at least an average of one sodium atom per silicon atom.

2. The process of claim 1 wherein the reactive silica is selected from the group consisting of sodium metasilicate, sodium orthosilicate and sodium silicate.

3. The process of claim 2 wherein the heating time in step (b) is from about 5 to about 24 hours.

4. The process of claim 3 wherein the heating temperature of step (b) is from about 80° to about 95° C.

5. The process of claim 4 wherein the amounts of reactive silica compound and water, per mole of aluminum alkoxide, are in the range of about 0.9 to about 2.0 and about 30 to about 60, respectively.

6. The process of claim 5 wherein the alkoxy groups of said aluminum alkoxide contain predominantly from about 4 to about 20 carbon atoms.

7. The process of claim 6 wherein the time of heating in step (b) is in the range of about 7 to about 14 hours.

8. The process of claim 7 wherein the reactive silica compound is sodium metasilicate.

9. A continuous process for preparing sodium Zeolite A, wherein the process comprises:
   (a) adding an admixture of (i) water containing reactive silica compound and (ii) $C_4$–$C_{20}$ aluminum alkoxide, continuously to a reaction vessel,
   (b) agitating the contents of the reaction vessel whereby an upper alcohol phase and a lower aqueous phase containing amorphous sodium aluminum silicate is formed, (c) removing the alcohols of said alcohol phase overhead, (d) heating the aqueous phase at a temperature in the range of about 70° to about 120° C. until substantially all of the amorphous sodium aluminum silicate therein is converted to sodium Zeolite A, and (e) recovering the sodium Zeolite A, said process being characterized further in that said reactive silica compound is water soluble and is one or more sodium salts of silicic acids containing at least an average of one sodium atom per silicon atom.

10. The process of claim 9 wherein the admixture of step (a) contains about 3 to about 100 moles of water per mole of aluminum alkoxide and about 0.7 to about 10 moles of reactive silica compound, as $SiO_2$, per mole of aluminum alkoxide.

11. The process of claim 10 wherein the heating time in step (d) is from about 5 to about 24 hours.

12. The process of claim 11 wherein the heating temperature in step (d) is from about 80 to about 95° C.

13. The process of claim 12 wherein the amounts of reactive silica compound and water, per mole of aluminum alkoxide, are in the range of about 0.9 to about 2.0 and about 30 to 60, respectively.

14. The process of claim 13 wherein the heating time in step (d) is in the range of about 7 to about 14 hours.

15. The process of claim 14 wherein the reactive silica compound is sodium metasilicate.

* * * * *